UNITED STATES PATENT OFFICE.

CHARLES LEE PECK, OF NEW YORK, N. Y., ASSIGNOR TO THE DORR COMPANY, A CORPORATION OF DELAWARE.

TREATMENT OF SOAPY LIQUORS.

1,349,530.                Specification of Letters Patent.    Patented Aug. 10, 1920.

No Drawing.           Application filed July 1, 1919.   Serial No. 308,053.

*To all whom it may concern:*

Be it known that I, CHARLES LEE PECK, a citizen of the United States, residing at New York city, in the county of New York, State of New York, have invented certain new and useful Improvements in the Treatment of Soapy Liquors; and I do hereby declare the following to be a full, clear, and exact description of the invention, such as will enable others skilled in the art to which it appertains to make and use the same.

This invention relates to the treatment of liquors containing organic material, and in particular to the treatment of waste liquors containing soapy constituents or soap-making substances. The invention contemplates the provision of an improved method of treating such liquors for the recovery or removal of the soapy or soap-making materials contained therein.

The waste liquors from many industrial operations contain soap-making or soapy constituents, which, when isolated from the liquor, are of commercial value. Thus, the soapy waste liquors of many commercial washing operations, such, for example, as laundry waste liquors, the waste liquors of textile and wool washing plants, silk gum liquors, and the like, contain organic material of a soapy character, or which may be readily converted into a soapy character. These waste liquors cannot ordinarily be discharged into streams or rivers without polluting the same, and, moreover, such a procedure may often be an economic waste of the soapy or soap-making organic matter present in the waste liquors.

In accordance with the present invention, the soapy organic material present in the waste liquors is first coagulated by any suitable agency, and the coagulated particles are then separated from the liquid by a flotation operation, which may be of substantially the same nature as is practised in the mineral flotation art. The coagulation of the soapy or soap-making organic material, in accordance with the principles of the present invention, may in certain cases be more aptly described as precipitating, flocculating, agglomerating, or the like, but throughout this specification and the appended claims, I have employed the term "coagulate," and its derivatives, in a generic sense to cover any operation by which the soapy material is brought into a more or less solid state, for the purpose of effecting its separation from the surrounding liquid by a flotation treatment. In general, the coagulation contemplated by the invention converts the soapy or soap-making organic matter into relatively small or finely divided particles which would normally sink in the liquid.

The two steps of coagulation and flotation may be carried out in sequence as separate operations. Thus, the soapy organic matter may first be coagulated in any suitable manner and the liquor then subjected to a flotation treatment. In general, however, I prefer to carry out the two operations simultaneously. Thus, the coagulating agent may be added to the raw liquor in any suitable type of flotation cell or apparatus. The coagulated particles, resulting from the action of the coagulating agent, attach themselves to the minute gas bubbles characteristic of the flotation treatment, and, rising to the surface therewith, are floated off in any suitable manner. The minute or finely divided gas bubbles may, for example, be introduced into the liquor through a porous bottom of the flotation apparatus, or by violent agitation, or they may be generated within the liquor itself.

The waste liquors from laundry operations, as well as the waste liquors from other washing operations, contain soluble soaps, fatty acids, and the like, in solution. Such soapy and soap-making materials may originate from washing and cleansing agents which have been employed during the operation, or may be formed in the liquor as a result of the operation itself. Whatever the source of such soapy or soap-making organic matter, the present invention contemplates its removal from the liquor by coagulation and flotation and the subsequent recovery of the organic material from the overflow froth.

The coagulation of soluble soaps and fatty materials is preferably brought about by converting these substances into insoluble soaps. For this purpose, lime or calcium salts may be used for forming insoluble calcium soaps. In the case of laundry waste liquors, I have found calcium chlorid a satisfactory coagulating agent. Thus, in accordance with the invention, the soluble soap, free fatty acids and other fatty materials of the laundry waste liquor are precipitated as insoluble calcium soaps by the addition of calcium chlorid to the raw liquor, and the precipitated or insoluble soap is then recovered by a flotation treatment. Laundry waste water also contains finely divided particles of sand, dirt, and the like, removed from the clothes laundered. This material is heavier than water and is not flotatable, so that it sinks to the bottom. Thus, the soapy and soap-making organic material is selectively floated while the aforementioned foreign matter sinks, leaving practically clear water as the effluent.

The overflow froth containing the flotated organic matter may be subjected to any appropriate further treatment. As the result of the coagulating treatment this organic matter in the overflow froth will be mainly present as an insoluble soap. This froth may thus be treated for the production of soap material, or the fatty materials may be liberated therefrom in any suitable manner for such subsequent use as they may be adapted. To this end, the overflow froth is preferably broken up and dehydrated to the desired extent, as for example by subjecting the froth to a suction filtering operation.

I have discovered that the filtering of the overflow froth, for effecting the removal therefrom of the insoluble soaps, is facilitated and expedited by agitation of the liquor during the flotation operation. In fact, I have found that it is often practically impossible to successfully filter such overflow froths unless the flotation operation is carried out with agitation of the liquor. This agitation may, of course, be in whole or in part relied upon to effect the flotation treatment itself. As previously stated, laundry waste liquors contain a certain amount of dirt and similar foreign matter, and agitation during the flotation treatment prevents such dirt from becoming enmeshed in the flotatable soapy material and carried off therewith. Furthermore, the agitation maintains the coagulated soapy material in a relatively finely divided physical condition and thus insures its ready filtration in the subsequent treatment of the overflow froth. Without agitation, the coagulated soapy material is very likely to be carried to the surface in relatively large masses, in which non-flotatable foregn matter is frequently enveloped, and the resulting overflow froth is in such a physical condition that subsequent filtration is extremely difficult, if not practically impossible.

The overflow froth resulting from the treatment of laundry waste liquors, as previously described, may be advantageously dehydrated by suction filtration. I have found a horizontal filter bed operatively positioned above a suitable suction chamber or agency well adapted for this purpose. The filtering operation serves the dual function of breaking up the froth and dehydrating the residue. The dehydration may be carried to any desired extent, and the residue subjected to any appropriate subsequent treatment. In the case of laundry waste liquors, I usually dehydrate the overflow froth until its moisture content is reduced to about 50%. The resulting residue, containing about 50% of moisture, may then be treated with an acid, such as sulfuric acid, for the liberation of the fatty materials, which latter rise to the surface and can be skimmed off, or otherwise removed in any convenient manner.

I claim—

1. The method of treating soapy liquors which comprises coagulating the soapy matter, removing the coagulated matter from the liquid by a flotation treatment, and treating the floated matter for the recovery of organic substances; substantially as described.

2. The method of treating waste liquors containing soapy or soap-making organic matter which comprises converting said matter into coagulated particles having selective attraction for gas bubbles, subjecting the liquor to the action of gas bubbles and entrapping the coagulated matter thereby and causing it to float by the buoyant action thereof, removing the floating matter from the liquid, and treating the floated matter for the recovery of organic substances therefrom; substantially as described.

3. The method of treating waste liquors containing soapy organic matter which comprises converting said soapy matter into coagulated particles, removing the coagulated matter from the liquid by a flotation treatment, and dehydrating the floated matter by suction filtration; substantially as described.

4. The method of treating waste liquors containing soapy or soap-making organic matter which comprises converting said matter into coagulated particles, agitating the liquor and removing the coagulated particles therefrom by flotation, and dehydrating the floated matter by filtration; substantially as described.

5. The method of treating waste liquors containing soapy or soap-making organic matter which comprises converting said matter into coagulated particles having selective attraction for gas bubbles, agitating the liquor and simultaneously subjecting it to the action of gas bubbles and entrapping the coagulated matter thereby and causing it to float by the buoyant action thereof, removing the floating matter from the liquid, and dehydrating the floated matter by suction filtration; substantially as described.

6. The method of treating soapy liquors which comprises coagulating the soapy matter, agitating the liquor and simultaneously removing the coagulated matter therefrom by flotation, dehydrating the floated matter by suction filtration until its moisture content is about 50%, and treating the dehydrated matter with sulfuric acid for the liberation of fatty material; substantially as described.

7. The method of treating laundry waste liquors which comprises treating the liquor with an appropriate calcium compound for converting the organic soapy matter thereof into coagulated particles, agitating the liquor and simultaneously removing the coagulated matter therefrom by flotation, dehydrating the floated matter, and treating the dehydrated matter for the recovery therefrom of fatty material; substantially as described.

8. The method of recovering fatty material from laundry waste liquors and similar waste waters containing the same which comprises adding thereto a compound forming with the fatty substances insoluble soaps, and recovering the said soaps from the liquor by a flotation operation; substantially as described.

9. The method of recovering fatty material from laundry waste liquors and similar waste waters containing the same which comprises adding to the liquor an appropriate calcium compound to convert the fatty substances into insoluble calcium soaps and subjecting the liquor to a flotation operation and thereby recovering the calcium soaps by flotation; substantially as described.

10. The process of recovering fatty material from laundry waste liquors and similar waste waters containing the same which comprises adding thereto a compound forming with the fatty substances insoluble soaps, agitating the liquor and simultaneously removing said insoluble soaps therefrom by flotation, dehydrating the floated matter by filtration, and treating the dehydrated matter for the liberation of fatty material; substantially as described.

11. The method of treating laundry waste liquors and similar waste waters containing soapy or soap-making organic matter which comprises treating the liquor with an appropriate calcium compound for converting the organic matter into coagulated particles, agitating the liquor and simultaneously subjecting it to the action of gas bubbles and entrapping the coagulated matter thereby and causing it to float by the buoyant action thereof, removing the floating matter from the liquid, dehydrating the floated matter by suction filtration, and treating the dehydrated matter with an acid which will liberate fatty material; substantially as described.

In testimony whereof I affix my signature.

CHARLES LEE PECK.